US012431644B2

(12) United States Patent
Hu

(10) Patent No.: US 12,431,644 B2
(45) Date of Patent: Sep. 30, 2025

(54) ELECTRICAL CONNECTOR FOR COMPACT SYSTEM

(71) Applicant: Amphenol Commercial Products (Chengdu) Co., Ltd., Chengdu (CN)

(72) Inventor: Xiaodong Hu, Chengdu (CN)

(73) Assignee: Amphenol Commercial Products (Chengdu) Co., Ltd., Chengdu (CN)

(*) Notice: Subject to any disclaimer, the term of this patent is extended or adjusted under 35 U.S.C. 154(b) by 457 days.

(21) Appl. No.: 17/950,364

(22) Filed: Sep. 22, 2022

(65) Prior Publication Data

US 2023/0096092 A1 Mar. 30, 2023

(30) Foreign Application Priority Data

Sep. 24, 2021 (CN) .......................... 202111120093.8
Sep. 24, 2021 (CN) .......................... 202122314591.8

(51) Int. Cl.
*H01R 12/70* (2011.01)
*H01R 12/72* (2011.01)

(52) U.S. Cl.
CPC ....... *H01R 12/7023* (2013.01); *H01R 12/721* (2013.01)

(58) Field of Classification Search
CPC .......................... H01R 12/7023; H01R 12/721
USPC .......................................................... 439/567
See application file for complete search history.

(56) References Cited

U.S. PATENT DOCUMENTS 3,573,706 A 4/1971 Haberlen
3,970,353 A 7/1976 Kaufman
4,241,966 A * 12/1980 Gomez .............. H01R 12/7005 439/372
4,487,468 A 12/1984 Fedder et al.
4,734,041 A 3/1988 Bruchmann et al.
(Continued)

FOREIGN PATENT DOCUMENTS

CN 1175101 A 3/1998
CN 200941440 Y * 8/2007
(Continued)

OTHER PUBLICATIONS

International Search Report and Written Opinion mailed Nov. 29, 2021 for International Application No. PCT/CN2021/114671.
(Continued)

*Primary Examiner* — Peter G Leigh
(74) *Attorney, Agent, or Firm* — Wolf, Greenfield & Sacks, P.C.

(57) ABSTRACT

An electrical connector for use in a compact system. The connector includes a housing having a pair of towers and an elongated slot between the towers. Each tower has an ejector, a rotator, and a locking member disposed therein. The rotator has a first arm coupled to the ejector and a second arm extending into the slot for coupling to a mating component inserted into the slot. When the first arm is pushed down by the ejector, the second arm pushes up the mating component, causing the locking member to deform so as to release the mating component. When the second arm does not push the mating component, the locking member is in its rest state and locks the mating component in the slot; Such a configuration enables the connector to unmate with a mating component without latches that move outside a perimeter of the connector.

20 Claims, 12 Drawing Sheets

(56) References Cited

U.S. PATENT DOCUMENTS 5,393,247 A 2/1995 DiOrazio et al.
5,478,259 A * 12/1995 Noschese ............. H01R 13/658 439/924.1
5,577,922 A * 11/1996 Enomoto ............. H05K 7/1409 439/157
5,580,257 A 12/1996 Harwath
5,746,613 A * 5/1998 Cheng .................. H05K 7/1409 439/157
5,876,214 A 3/1999 McHugh et al.
5,997,312 A 12/1999 Ho et al.
6,638,105 B1 10/2003 Wu
6,645,012 B2 11/2003 Ito et al.
6,648,682 B1 11/2003 Wu
6,702,598 B1 * 3/2004 Lo ...................... H01R 12/7005 439/328
7,008,250 B2 3/2006 Shuey et al.
7,074,067 B2 7/2006 Yang et al.
7,207,815 B1 * 4/2007 Ju ...................... H01R 12/7029 439/159
7,607,949 B2 10/2009 Hsu
7,637,783 B2 12/2009 Sasaoka et al.
7,677,907 B2 3/2010 Guan et al.
7,789,681 B2 * 9/2010 Guan ................. H01R 12/7005 439/157
7,892,006 B2 2/2011 Guan et al.
7,922,506 B1 * 4/2011 Harlan ................. H01R 12/737 439/160
7,955,098 B1 * 6/2011 McKee ............ H01R 13/62988 439/372
7,972,171 B2 7/2011 Teh
8,187,031 B2 5/2012 Li et al.
8,403,689 B2 3/2013 Li et al.
8,535,077 B2 9/2013 Shen et al.
9,325,090 B2 4/2016 Shen et al.
9,685,723 B2 6/2017 Kee Mew
9,806,460 B2 * 10/2017 Li .................... H01R 13/62955
10,070,549 B2 * 9/2018 Su ........................ H05K 7/1409
10,103,476 B1 10/2018 Qiu et al.
10,135,165 B2 11/2018 Zuo
10,224,653 B2 3/2019 Niu et al.
11,374,340 B2 6/2022 Tang
2008/0026618 A1 * 1/2008 Mon .................. H01R 12/7005 439/159
2009/0077293 A1 * 3/2009 Kerrigan .............. H05K 7/1409 710/301
2010/0075538 A1 3/2010 Ohshida
2011/0021080 A1 1/2011 Kamiya et al.
2011/0065297 A1 3/2011 Guan et al.
2011/0159718 A1 * 6/2011 McKee .................. H01R 13/64 439/326
2011/0275238 A1 11/2011 Iijima et al.
2012/0178274 A1 7/2012 Manickam
2012/0329301 A1 * 12/2012 Li ........................ H01R 12/721 439/157
2013/0095679 A1 * 4/2013 Li ...................... H01R 12/7005 439/157
2013/0109216 A1 * 5/2013 Chien ................ H01R 12/7005 439/345
2013/0280926 A1 10/2013 Ono
2013/0288504 A1 * 10/2013 Sass ................... H01R 12/7029 439/328
2014/0377972 A1 * 12/2014 Tang .................... H01R 12/721 439/157
2016/0020540 A1 1/2016 Shen et al.
2016/0190724 A1 6/2016 Mito
2016/0336667 A1 11/2016 Kee Mew
2017/0012389 A1 * 1/2017 Li ........................ H01R 12/737
2018/0212362 A1 * 7/2018 Wang ..................... H01R 33/97
2019/0199023 A1 6/2019 Soh
2020/0203867 A1 6/2020 Lu
2021/0288423 A1 9/2021 Guo et al.
2021/0376508 A1 12/2021 Hu
2022/0037828 A1 2/2022 Hu et al.
2022/0069496 A1 3/2022 Yi et al.
2022/0181809 A1 6/2022 Xie et al.
2022/0181811 A1 6/2022 Liu et al.
2022/0247107 A1 8/2022 Tang et al.

FOREIGN PATENT DOCUMENTS

CN 201000953 Y * 1/2008
CN 202633554 U 12/2012
CN 203660106 U 6/2014
CN 105703103 A 6/2016
CN 108539464 A 9/2018
CN 212874843 U 4/2021
CN 214505858 U 10/2021
EP 0820124 A2 1/1998
GB 227943 A 1/1925
GB 2288924 A * 11/1995 ........... H01R 13/635
TW 200835073 A 8/2008
TW M475740 U 4/2014
WO WO 02/073819 A2 9/2002

OTHER PUBLICATIONS

[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].

[No Author Listed], DDR5 SDRAM—Wikipedia. Aug. 8, 2021. 6 pages. URL:https://en.wikipedia.org/wiki/DDR5_SDRAM [last accessed on Aug. 16, 2021].

[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].

[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].

Armasu, What We Know About DDR5 So Far. Jun. 7, 2019. 20 pages. URL:https://www.tomshardware.com/news/what-we-know-ddr5-ram,39079.html [last accessed Jul. 21, 2022].

Yang et al., Electrical Connector, U.S. Appl. No. 17/973,913, filed Oct. 26, 2022.

Yang et al., Electrical Connector, U.S. Appl. No. 17/988,330, filed Nov. 16, 2022.

Yang et al., Electrical Connector, U.S. Appl. No. 18/075,246, filed Dec. 5, 2022.

* cited by examiner

ELECTRICAL CONNECTOR FOR COMPACT SYSTEM

RELATED APPLICATIONS

This application claims priority to and the benefit of Chinese Patent Application Serial No. 202111120093.8, filed on Sep. 24, 2021. This application also claims priority to and the benefit of Chinese Patent Application Serial No. 202122314591.8, filed on Sep. 24, 2021. The contents of these applications are incorporated herein by reference in their entirety.

FIELD

This patent application relates generally to interconnection systems, such as those including electrical connectors, used to interconnect electronic assemblies.

BACKGROUND

Electrical connectors are used in many electronic systems. It is generally easier and more cost effective to manufacture a system as separate electronic assemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

Computers, for example, are often manufactured with connectors that serve as sockets for memory cards. A memory card may contain one or multiple memory chips and may be inserted into a socket to increase the available memory in the computer. Memory cards generally have standardized electrical and mechanical interfaces, as do the memory sockets. Many memory cards, for example, are designed according to a DDR standard, such as DDR4 or DDR5.

Sockets according to those standards have a card slot to receive a memory card and make electrical connections to it. Such sockets typically have an ejector that is mounted at a pivot point in the socket. The upper end of the ejector may be rotated about that pivot point into a position where it engages an opening in the memory card, locking the memory card in the socket. When the upper end of the ejector is rotated away from the socket, the bottom end of the ejector rotates upwards from underneath the memory card, pushing the memory card upwards in the slot so that it can be removed from the socket.

BRIEF SUMMARY

Aspects of the present disclosure relate to electrical connectors for compact systems.

Some embodiments relate to an electrical connector. The electrical connector may include a housing comprising a slot elongating in a longitudinal direction and a tower disposed at an end of the slot and extending in a vertical direction perpendicular to the longitudinal direction; a plurality of terminals held by the housing, each of the plurality of terminals comprising a mating end curving into the slot, a mounting end extending out of the housing, and an intermediate portion joining the mating end and the mounting end; and an ejector and a rotator disposed in the tower, wherein the rotator is coupled to the ejector such that movement of the ejector makes the rotator rotate about an axis.

In some embodiments, the ejector may comprise an outer end extending out of a top surface of the tower, an inner end coupled to the rotator, and a portion joining the outer end and the inner end.

In some embodiments, the rotator may comprise a first end coupled to the ejector and a second end extending into the slot, and the axis is located between the first end and second end of the rotator.

In some embodiments, the rotator may comprise a first arm having the first end and a second arm having the second end, the axis may be at a joint of the first arm and the second arm, and the first arm and the second arm may extend in an obtuse angle.

In some embodiments, a distance from the first end to the axis may be less than a distance from the second end to the axis.

In some embodiments, the electrical connector may comprise a locking member, wherein at least a portion of the locking member is elastic.

In some embodiments, the tower may be a first tower, the ejector and rotator may be a first ejector and a first rotator disposed in the first tower, the electrical connector may comprise a second tower disposed at an opposite end of the slot and extending in the vertical direction, and the slot may extend between the first tower and the second tower.

In some embodiments, the electrical connector may comprise a second ejector and a second rotator coupled to the second ejector such that a movement of the second ejector can make the second rotator to rotate about an axis.

In some embodiments, the electrical connector may comprise a second locking member, wherein at least a portion of the second locking member is elastic.

Some embodiments relate to an electrical connector. The electrical connector may include a housing comprising a slot elongating in a longitudinal direction and a tower disposed at an end of the slot, the tower comprising a mounting groove extending in a vertical direction perpendicular to the longitudinal direction; a plurality of terminals held by the housing, each of the plurality of terminals comprising a mating end curving into the slot, a mounting end extending out of the housing, and an intermediate portion joining the mating end and the mounting end; and an ejector disposed in the mounting groove and configured to be movable within the mounting groove.

In some embodiments, the ejector may comprise an outer end extending out of the housing, an inner end opposite the outer end, and a portion joining the outer end and the inner end, the mounting groove may comprise a first groove holding the portion of the ejector and a second groove extending through the tower, and a width of the second groove may be less than a width of the first groove in a lateral direction perpendicular to the longitudinal direction and the vertical direction.

In some embodiments, the ejector may comprise a first lug and a second lug protruding from the portion in the lateral direction, the tower may comprise a first notch and second notch extending from the second groove in the lateral direction, and the electrical connector may comprise a first member disposed in the first notch and a second member disposed in the second notch.

In some embodiments, the mounting groove may comprise a fourth groove comprising an inclined surface, and the inner end of the ejector may comprise an initial section extending into the fourth groove, a tail section extending into the second groove, and a curved section joining the initial section and the tail section.

In some embodiments, a distance between the curved section and the first lug may be greater than a distance between the fourth groove and the first notch in the vertical direction.

In some embodiments, the electrical connector may comprise a rotator disposed in the mounting groove and comprising a first end coupled to the ejector and a second end extending into the slot, wherein the rotator is configured to rotate about an axis located between the first and the second end upon a movement of the ejector.

In some embodiments, the rotator may comprise a first arm having the first end and a second arm having the second end, the axis is at a joint of the first arm and the second arm, and the first arm and the second arm may extend in an obtuse angle.

In some embodiments, the first arm may be shorter than the second arm.

In some embodiments, the electrical connector may comprise a locking member comprising a base portion attached to the tower and an intermediate portion cantilevering from the base portion, the intermediate portion comprising a protrusion curving away from the ejector.

Some embodiments relate to a method of operating an electrical connector to release an electronic card mated with the electrical connector, the electrical connector comprising a housing having a slot elongating in a longitudinal direction and a tower disposed at an end of the slot, and an ejector and a rotator disposed in the tower, the rotator comprising a first arm coupled to the ejector and a second arm coupled to the electronic card. The method may comprise moving the ejector in a vertical direction perpendicular to the longitudinal direction; and removing the electronic card from the slot, wherein the moving of the ejector causes the rotator to rotate about an axis located at a joint of the first arm and the second arm.

In some embodiments, the electrical connector may comprise a locking member disposed in the tower and engaging the electronic card, and the rotating of the rotator may cause the locking member to deform and disengage the electronic card.

Some embodiments relate to an electrical connector for a compact system. The electrical connector may comprise a housing and a locking member arranged in a slot. A top surface of the housing may be provided with the slot recessed along a first direction, and the slot may be configured for receiving an electrical element. The locking member may be configured to at least partially fit in a notch of an electrical element to hold the electrical element in the slot and be separated from the notch by an external force.

In some embodiments, the electrical connector for the compact system may further comprise an assembly. The assembly may be arranged on the housing and have an operable part; the operable part may be movable along a second direction parallel with the first direction; and the assembly may be configured to lift the electrical element by the movement of the operable part such that the notch may be separated from the locking member.

In some embodiments, the assembly may comprise an ejector and a rotator; the ejector may be capable of moving along the second direction; the operable part may be arranged on an outer end of the pushing part exposed out of the housing; an inner end of the ejector may be engaged with the rotator; and the rotator may be configured for transmitting the movement of the ejector to the electrical element to lift the electrical element.

In some embodiments, the rotator may be pivotally arranged in the housing.

In some embodiments, an axis of the rotator may be located at the middle of the rotator; the ejector may be engaged with a first end of the rotator; and a second end of the rotator may be used for lifting the electrical element.

In some embodiments, the rotator may comprise an first arm and a second arm; the first arm and the second arm are connected mutually to form a V shape; the axis may be located at a connecting part of the first arm and the second arm; the first end may be located on the first arm; the second end may be located on the second arm; the opening of the V shape may face the top surface; and an angle between the first arm and the second arm may be an obtuse angle.

In some embodiments, a distance from the first end to the axis may be less than a distance from the second end to the axis.

In some embodiments, the housing may be provided with a mounting groove; the mounting groove may comprise a first groove, a second groove, a first notch, and a second notch; the first groove and the second groove extend along the second direction from the top surface; the first groove may be arranged in a side wall of the housing; the second groove may communicate between the middle of the first groove and an outer surface of the side wall; a width of the second groove may be less than a width of the first groove; the first notch and the second notch may respectively extend from the second groove to two sides and communicate between the first groove and the outer surface of the side wall. The ejector may further comprise a portion connected between the outer end and the inner end, and a first lug and a second lug which protrude from the portion to two sides respectively; during the ejector being mounted onto the first groove through the second groove, the first lug and the second lug may enter the first groove respectively through the first notch and the second notch such that the ejector may be movable along the first groove. The electrical connector for the compact system may further comprise a member; and the member may be used for limiting the ejector in the mounting groove.

In some embodiments, the inner end of the ejector may extend into the second groove.

In some embodiments, an end of the first groove away from the top surface may be provided with a fourth groove; the fourth groove and the second groove may be arranged oppositely; the inner end of the ejector may protrude towards the fourth groove; the protruded part may be accommodated in the fourth groove during the reciprocating movement of the ejector; and a distance between the protruded part and the first lug may be greater than a distance between the fourth groove and the first notch.

In some embodiments, a surface of the fourth groove opposite to the second groove may be an inclined surface; and the inclined surface may incline towards the slot along a direction away from the top surface.

In some embodiments, the portion may be further provided with a third lug and a fourth lug which respectively protrude towards two sides.

In some embodiments, the third lug may be located between the first lug and the outer end; and the fourth lug may be located between the second lug and the outer end.

In some embodiments, the mounting groove may further comprise an third groove; the third groove may be recessed towards the slot from a side surface of the first groove opposite to the second groove; the third groove may extend along the second direction; and the third groove may align with the portion.

In some embodiments, the member may comprise a first member inserted into the first notch and a second member inserted into the second notch.

In some embodiments, the inner end of the ejector may be hook-shaped; the inner end may comprise an inner initial section, an inner tail section, and an inner curved section connected between the inner initial section and the inner tail section; the inner initial section extends towards the slot from the portion; and the inner tail section extends towards the second groove from the inner curved section.

In some embodiments, the inner tail section may be engaged with the rotator by abutting against the rotator.

In some embodiments, the outer end of the ejector may comprise an outer initial section, an outer tail section, and an outer curved section connected between the outer initial section and the outer tail section; the outer initial section may extend towards the slot from the portion; and the outer tail section may extend from the outer curved section along a direction away from the slot.

In some embodiments, the inner end of the ejector may be provided with a contact surface; and the contact surface may abut against the rotator.

In some embodiments, the rotator may be located at the bottom of the slot; and the rotator may be used for lifting an inserted end of the electrical element.

In some embodiments, the ejector may be an integrated piece.

In some embodiments, the locking members and the assemblies are arranged in pairs; each pair of the locking members are arranged on two sides of the slot respectively; and each pair of the assemblies are arranged on the two sides of the slot respectively.

In some embodiments, the locking member may comprise a base portion and an intermediate portion; the base portion may be arranged in the slot; the intermediate portion may extend from the base portion in a cantilever manner; and a middle of the intermediate portion may protrude towards an interior of the slot.

In some embodiments, a distal end of the intermediate portion may be located in the slot relative to a connecting end of the intermediate portion connected to the base portion.

These techniques may be used alone or in any suitable combination. The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
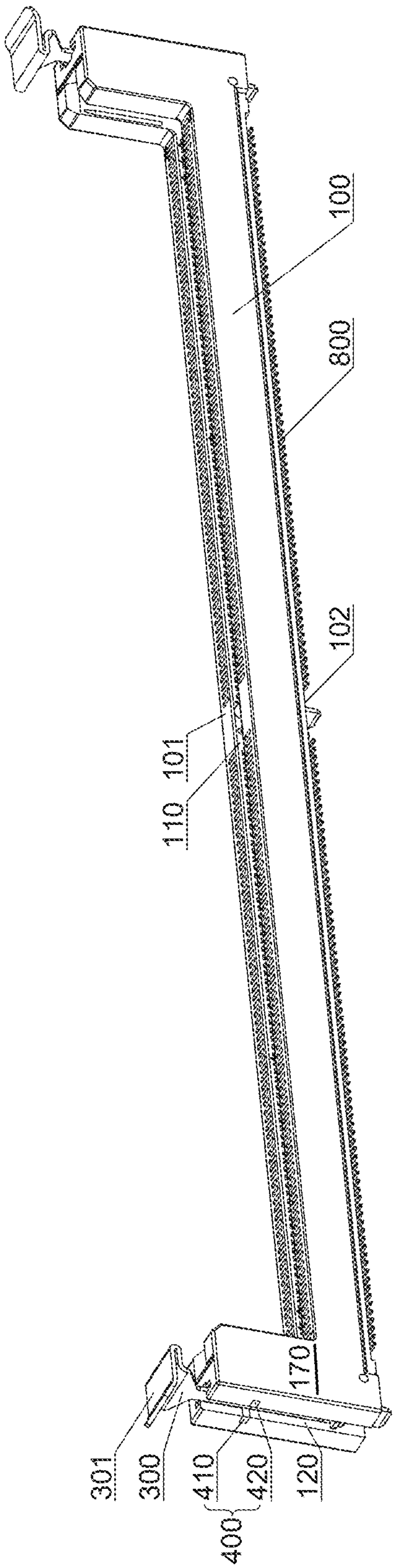
FIG. 1 is a perspective view of an electrical connector for a compact system, according to some embodiments.
Figure 2:
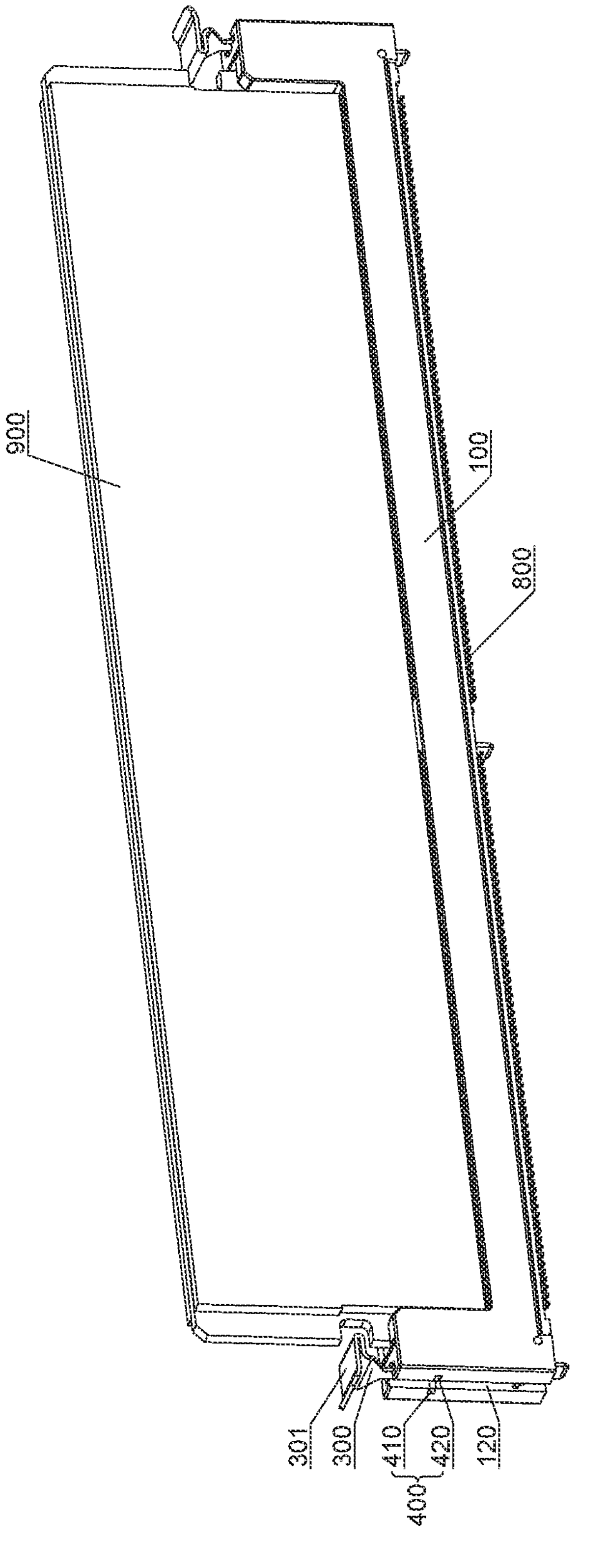
FIG. 2 is a perspective view of the electrical connector of FIG. 1 with an electronic card inserted.
Figure 3:
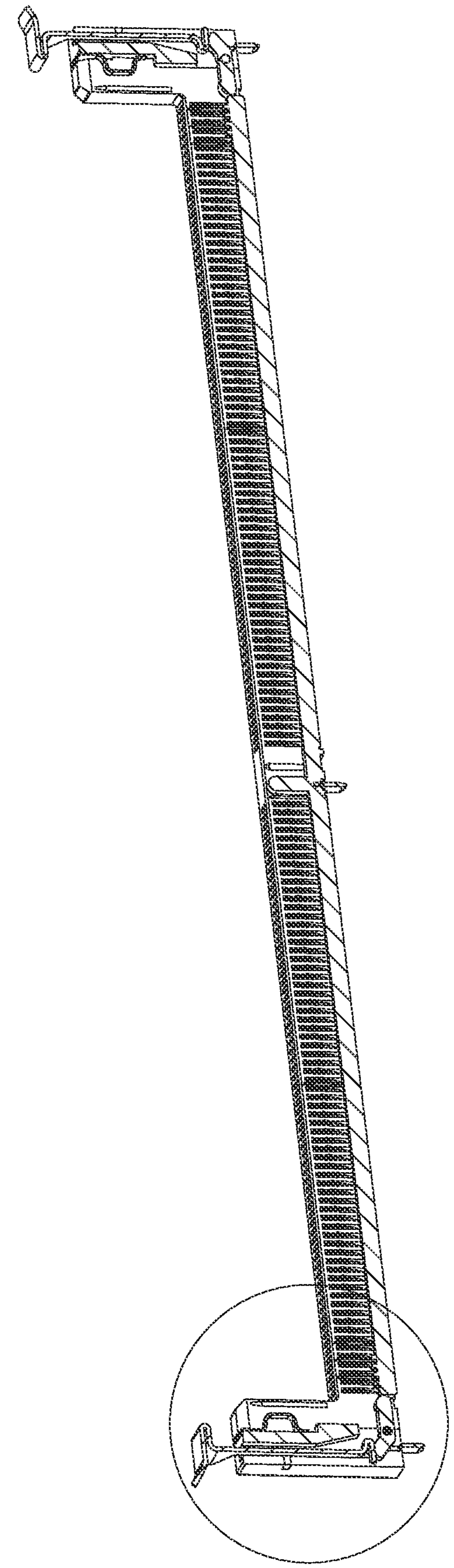
FIG. 3 is a cross-sectional perspective view of the electrical connector of FIG. 1.
Figure 4:
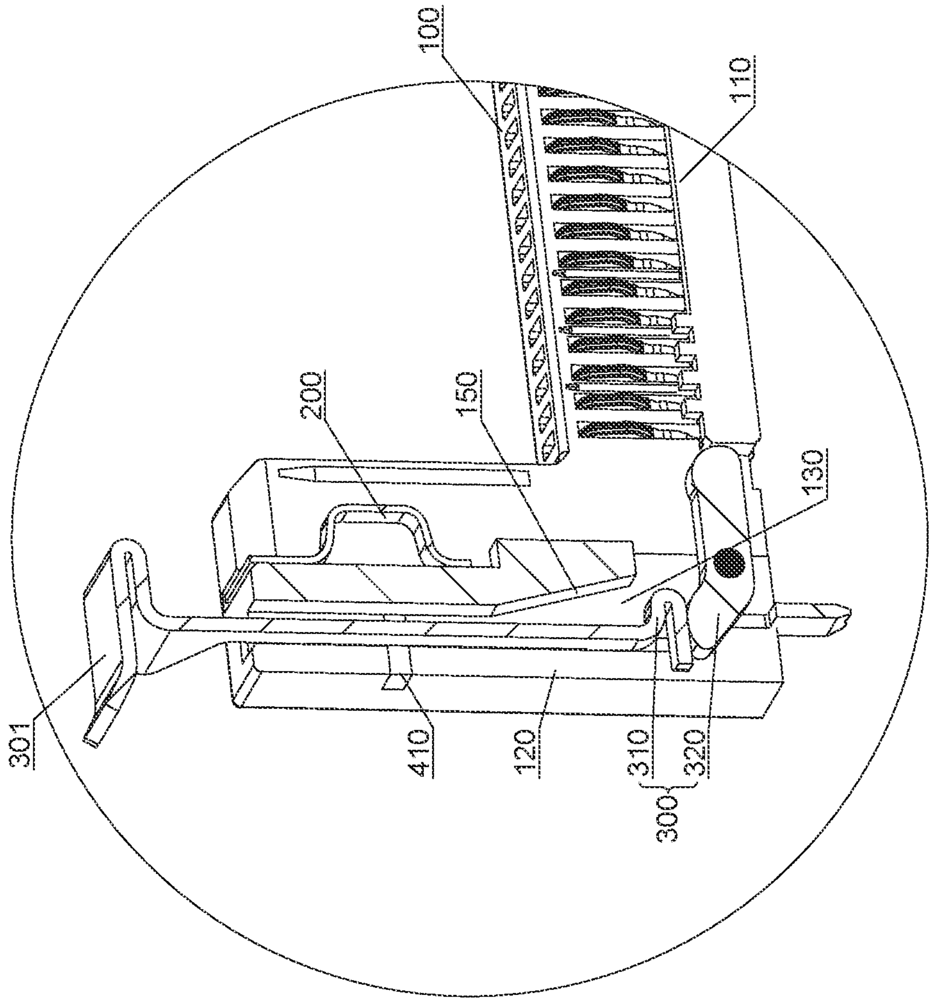
FIG. 4 is an enlarged perspective view of a portion of the electrical connector circled in FIG. 3, showing an assembly in a locked position.

The Inventors have recognized and appreciated connector design techniques that enable connectors to be disposed closer to adjacent components and therefore enable the systems to be more compact. The Inventors have recognized and appreciated that conventional connectors require latches for releasing a mating component from the connectors. To provide a sufficient space for the latches to move when releasing a mating component from the conventional connectors, the conventional connectors have to be placed away from adjacent components by at least a predetermined distance. This space may be referred to as a "keep out zone." The Inventors have recognized and appreciated connectors that may unmate with a mating component without the latches that require the keep out zone.

An electrical connector may include a housing having a slot elongating in a longitudinal direction and configured to receive a mating component such as an electronic card. The housing may hold terminals that have mating ends curving into the slot and mounting ends extending out of the housing. The electronic card may have contact pads aligned in a row along an edge inserted into the slot to make contact with respective mating ends of the terminals. The mounting ends of the terminals may be mounted to another component such as a printed circuit board. Other components may be mounted to the printed circuit board without the need for a keep out zone for the electrical connector.

The electrical connector may include an assembly configured to transform a force applied in a vertical direction to a force ejecting the electronic card out of the slot so as to eliminate the need to have latches that move outside a perimeter of the connector. The assembly may include an ejector configured to be movable in the vertical direction and a rotator configured to rotate about an axis in response to a movement of the ejector. The rotator may extend into the slot and be coupled to the electronic card such that the rotation of the rotator may cause the electronic card to move out of the slot. The rotator may include a first arm coupled to the ejector and a second arm coupled to the electronic card. The axis may be located at a joint of the first arm and the second arm. The first arm and the second arm may be sized and shaped to enable the electronic card to be released by a vertical force of a desired amount. For example, the first arm and the second arm may extend in an obtuse angle. The first arm may be shorter than the second arm.

The assembly may include a locking member configured to prevent the electronic card from being accidentally unmated from the connector. At least a portion of the locking member may be configured to fit in a matching feature of the electronic card such as a notch so as to prevent any relative movements between the connector and the card. The portion of the locking member may be elastic such that it may deform when the card is moved by the rotator and therefore disengage the card. When the card is removed, the portion of the locking member may return to its rest state.

Similarly, the electrical connector may mate with an electronic card with the assembly interacting with the card. For example, the insertion of an electronic card may cause the portion of the locking member to deform until the electronic card is inserted into position and the portion of the locking member fits in the notch of the card. When the portion of the locking member fits in the notch of the card, the portion of the locking member may return to its rest state.

FIG. 1 to FIG. 12 is an example of techniques as described herein integrated into an electrical connector. The electrical connector may include a housing 100 and a locking member 200. The housing 100 may have a top surface 101 and a mounting surface 102. The top surface 101 may be provided with a slot 110 which is recessed along a first direction. The slot 110 may be configured to receive a mating component such as an electronic card or a plug electrical connector. In the exemplary embodiments illustrated below, an electronic card 900 is a mating component.

The slot 110 may elongate between two towers 170 of the electrical connector. The slot 110 may extend into the towers. The mounting surface 102 may face a printed circuit board. The electronic card 900 may be inserted into the slot 110, and the electrical connector may be mounted to the printed circuit board, such that the electronic card is electrically connected to the printed circuit board through the electrical connector, and a circuit on the electronic card and a circuit on the printed circuit board are interconnected. The housing 100 may be provided with a plurality of terminals 800. Each of the plurality of terminals 800 may include a mating end curving into the slot 110, a mounting end extending out of the mounting surface 102 and configured to be mounted to the printed circuit board, and an intermediate portion joining the mating end and the mounting end. The terminals 800 may be electrically connected to the printed circuit board through any proper manners such as welding. The terminals 800 may include but are not limited to one or more kinds of signal terminals and grounding terminals. The terminals 800 may be arranged on the housing 100 in any pattern according to their types.

Figure 5:
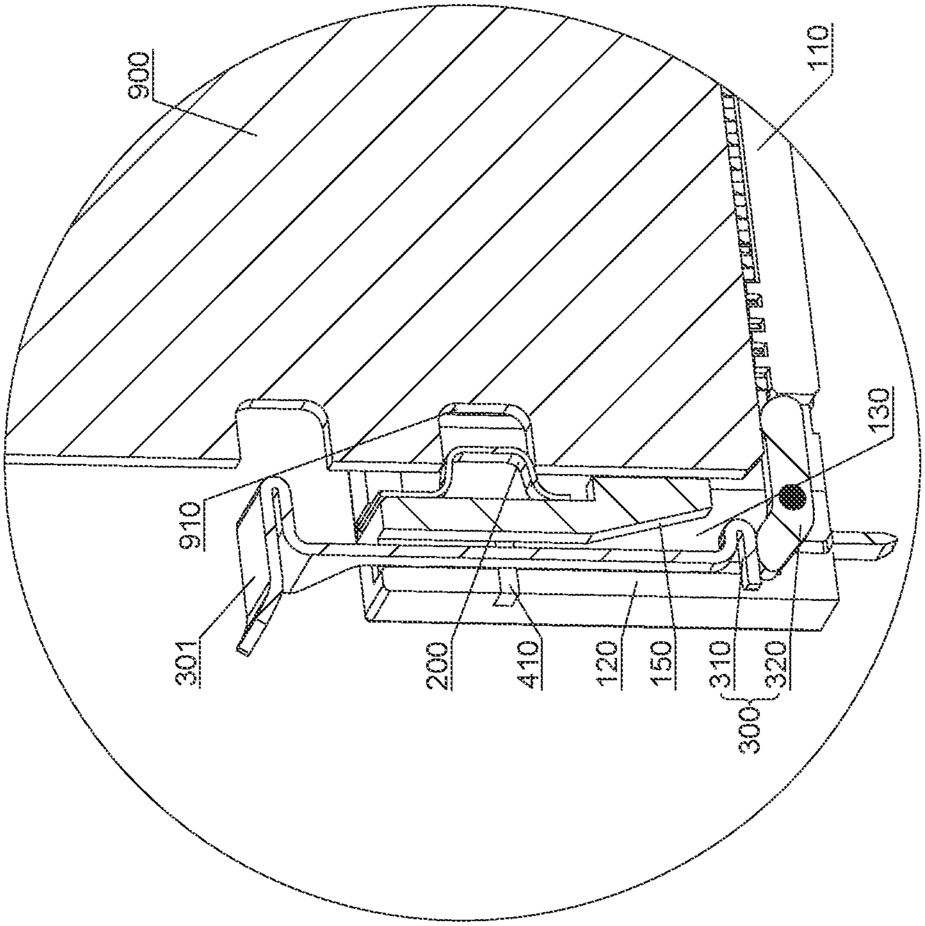
FIG. 5 is a perspective view of the portion of the electrical connector shown in FIG. 4 with a mating electronic card.
Figure 6:
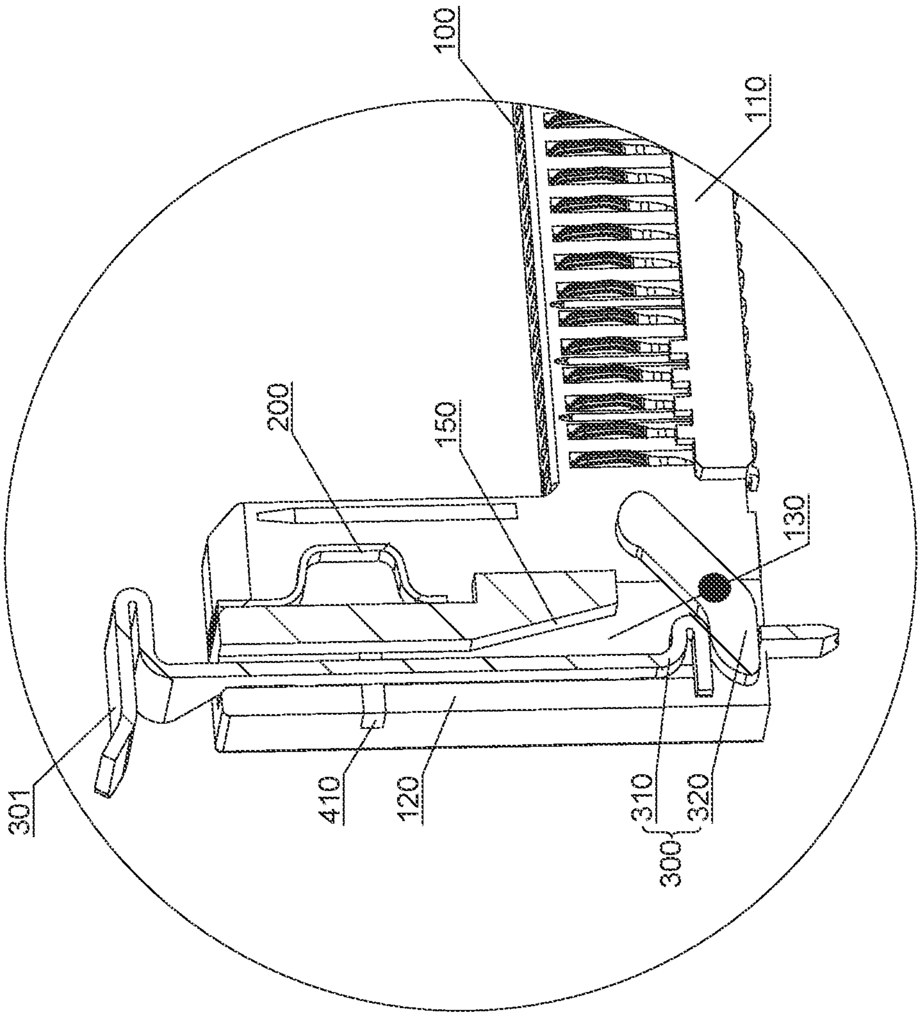
FIG. 6 is a perspective view of the portion of electrical connector shown in FIG. 4, showing the assembly in an unlocked position.
Figure 7:
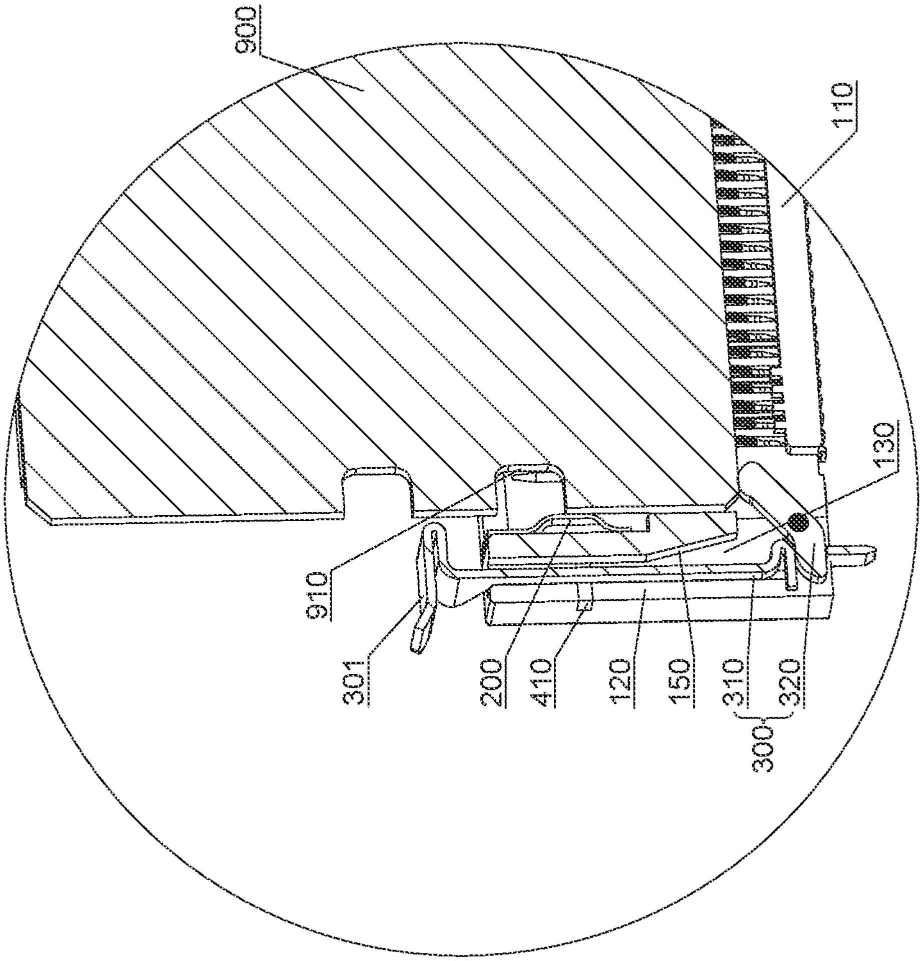
FIG. 7 is a perspective view of the portion of the electrical connector shown in FIG. 6 with a mating electronic card.
Figure 8:
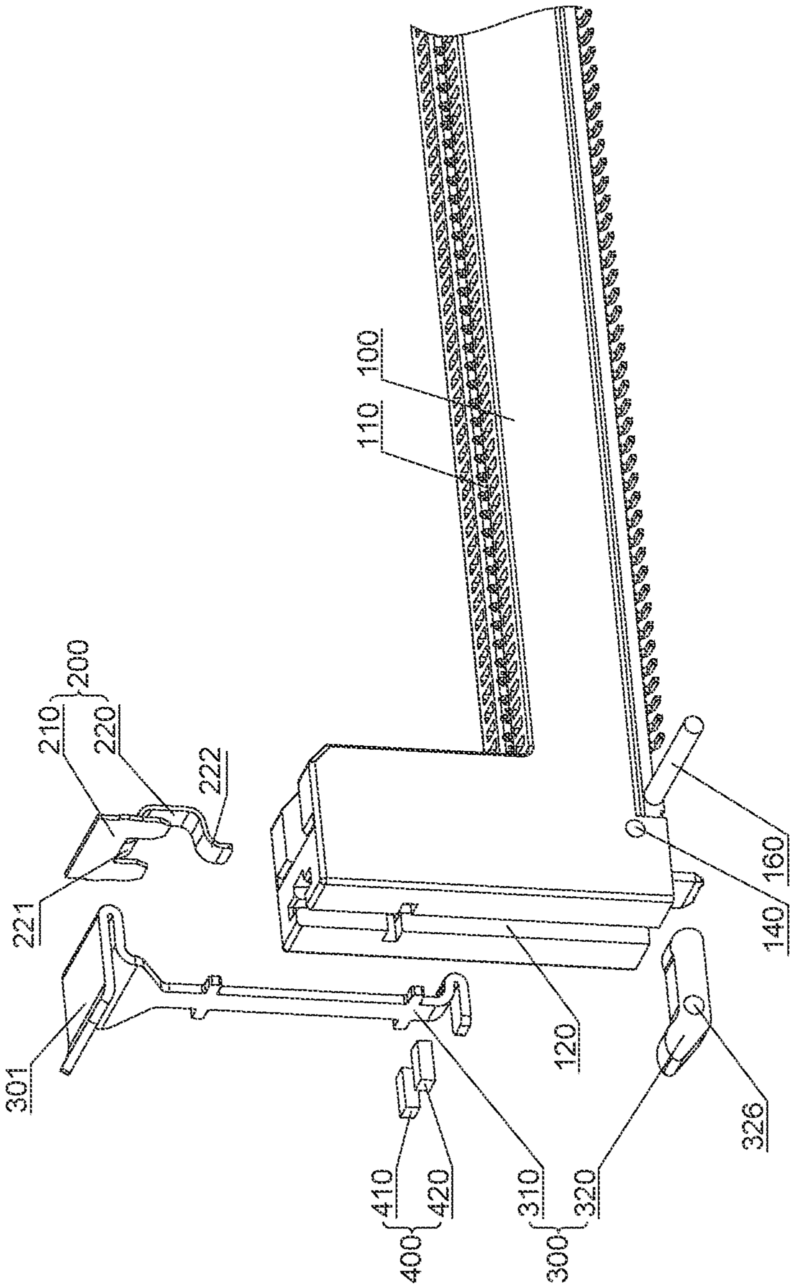
FIG. 8 is an exploded perspective view of a portion of the electrical connector of FIG. 1.

The locking member 200 may be disposed in a tower of the electrical connector. As shown in FIG. 8, the locking member 200 may be inserted into a portion of the slot 110 that extends into the tower. The locking member 200 may be arranged in the slot 110 in any suitable manner such as welding and/or adhesion. As shown in FIG. 5. the electronic card 900 may have a notch 910. The locking member 200 may be configured to at least partially fit in the notch 910 so as to hold the electronic card 900 in the slot 110. The locking member 200 may be configured to be separable from the notch 910 by, for example, an external force that may be applied to the electrical connector and/or the electronic card 900 by an operator such as a force of pressing the locking member 200, a force of pushing the electronic card 900, and a force of pulling the electronic card 900.

As shown in FIG. 5, the notch 910 may include a groove, and the locking member 200 may include a protrusion configured to at least partially fit in the groove. The protrusion of the locking member 200 may be elastic so as to be separable from the groove of the notch 910. The locking member 200 and the notch 910 may adopt any suitable structures.

When operating the electrical connector, the electronic card 900 may be inserted into the slot 110 along a first direction by an external force applied thereto. During the insertion, the locking member 200 may be pressed by the electronic card 900, so that the locking member 200 may deform and the electronic card 900 may be further inserted. The electronic card 900 may be inserted until the locking member 200 fits in the notch 910 and returns to a rest state so as to prevent the locking member 200 from accidentally disengaging the notch 910. Such a configuration enables the electronic card 900 to be reliably held in the slot 110. When removing the electronic card 900, an external force opposite to an insertion direction may be applied to the electronic card 900. During the removal, edges of the notch 910 of the electronic card 900 may press the locking member 200 so as to deform the locking member 200 and therefore disengage the locking member 200 from the notch 910. After the electronic card 900 is removed, the locking member 200 may return to its rest state.

The locking member 200 is disposed in the slot 110 and therefore takes no additional space outside the connector housing. Such a configuration enables the reduction of the spacing between the electrical connector and an adjacent device on a printed circuit board and therefore the miniaturization of an electronic system.

As shown in FIG. 1 to FIG. 12, the electrical connector may further include an assembly 300. The assembly 300 may be disposed in the towers of the housing 100. The assembly 300 may be provided with an operable part 301. The operable part 301 may be movable along a second direction. The second direction may be parallel with the first direction. The assembly 300 may be configured to lift the electronic card 900 by the movement of the operable part 301, so that the notch 910 is separated from the locking member 200.

The operable part 301 may be operated (for example, pressed or pulled) along the second direction to remove the electronic card 900. The operable part 301 may drive the assembly 300 to move so as to lift the electronic card 900. The assembly 300 may include various types of transmission pieces which can convert the movement of the operable part 301 along the second direction into a force to lift the electronic card 900. During the lift, the notch 910 of the electronic card 900 may cause the locking member 200 to deform, so that the notch 910 is separated from the locking member 200, and the electronic card 900 can be taken out. After the electronic card 900 is removed, the locking member 200 may return to its rest state. When inserting the electronic card 900, the electronic card 900 may be directly inserted into the slot 110 along the first direction. During the insertion, the notch 910 of the electronic card 900 may cause the locking member 200 to deform, so that the electronic card 900 can be further inserted. The locking member 200 may return to its rest state when the electronic card 900 is inserted into a preset position, and the notch 910 is mated with the locking member 200. The electronic card 900 can be held in the slot 110.

The operable part 301 of the assembly 300 may be operated by a user along a direction parallel with an insertion direction of the electrical element (such as the electronic card 900). Such a configuration uses the space above the connector rather than the space besides the connector, and therefore reduces the spacing between the electrical connector and an adjacent device on a printed circuit board, enabling the miniaturization of an electronic system.

The operable part 301 may have any suitable structure. As illustrated, the operable part 301 may have a larger contact surface. In this way, the operable part 301 can be found easily, the pressure intensity applied to the operable part 301 by a user can be reduced, and thereby improving use experience. For example, the operable part 301 may be formed by stamping and folding a metal sheet. As another example, the operable part 301 may have an anti-skid layer, such as a frosted layer and a rubber layer. If the operable part 301 is too smooth, an operating object (such as a user's hand) may slip off the operable part 301. The operable part 301 may be made of an insulating material, for example, the same material as that of the housing 100. In this way, static electricity cannot be conducted to the electrical connector and the electronic card 900 in the operation process.

As illustrated, each tower of the electrical connector may have a locking member 200 and an assembly 300 disposed therein. The locking member 200 and the assembly 300 may be arranged on the same side or different sides of the slot 110. As shown in the figure, the locking members 200 and the assemblies 300 may be arranged in pairs. Each pair of locking members 200 may be arranged on two sides of the slot 110 respectively, for example, a first side and a second side which are opposite to each other. Each pair of assemblies 300 may be arranged on two sides of the slot 110 respectively, for example, a third side and a fourth side which are opposite to each other. The first side and the second side may be the same as the third side and the fourth side respectively, or the first side and the second side may be completely different sides from the third side and the fourth side. It may be understood that the notches 910 may be arranged at corresponding positions of two sides of the electronic card 900. In this way, the notches 910 on the two sides of the electronic card 900 may at least partially fit in the corresponding locking members 200 respectively, so that the electronic card 900 is held in the slot 110 under uniform force. The connection strength between the electronic card 900 and the slot 110 may be higher. When the assemblies 300 on two sides are operated at the same time, the electronic card 900 can be lifted by the movement of the respective operable parts 301 of the assemblies 300, so that the notches 910 are separated from the locking members 200. Compared to affording force only on one side of the electronic card, affording forces on two sides on balance may avoid damage. Although in the illustrated example each tower has a locking member 200 and an assembly 300 disposed therein, it should be appreciated that only one tower may have a locking member 200 and an assembly 300 disposed therein in some embodiments.

As shown in FIG. 8, the locking member 200 may include a base portion 210, a distal end 222, and an intermediate portion 220 joining the base portion 210 and distal end 222. The base portion 210 may be arranged in the slot 110 through any proper manner such as insertion, welding or adhesion. The intermediate portion 220 may extend from the base portion 210 in a cantilever manner. A middle of the intermediate portion 220 may protrude towards an interior of the slot 110. The middle of the intermediate portion 220 may form a protrusion configured to at least partially fit in the notch 910 of the electronic card 900. The intermediate portion 220 may deform under the action of an external force. When the middle of the intermediate portion 220 is in its rest state, the intermediate portion 220 may be locked in the notch 910 of the electronic card 900 so as to prevent the electronic card 900 from accidentally disengaging the slot 110. When removing the electronic card 900, edges of the notch 910 of the electronic card 900 may press the middle of the intermediate portion 220, so that the intermediate portion 220 may deform and disengage the notch 910 of the electronic card 900. Such a configuration enables repeatably inserting and removing the electronic card 900 as needed. The locking member 200 has a simple structure, low manufacturing cost and reliable performance.

The intermediate portion 220 may have a connecting end 221 connected to the base portion 210. Further, the distal end 222 may be closer to the slot 110 relative to the connecting end 221 of the intermediate portion 220. In this way, when inserting the electronic card 900, the distal end 222 may extend downwards, so that the inserting process is smoother. When removing the electronic card 900, the distal end 222 may move upwards by following the notch 910 of the electronic card 900. The locking member 200 may be configured to require a suitable external force to disengage the notch 910 and therefore prevent the electronic card 900 from accidentally disengaging the electrical connector.

As shown in FIG. 4 to FIG. 9, the assembly 300 may include an ejector 310 and a rotator 320. The ejector 310 is capable of moving along a second direction. The ejector 310 may include an outer end 340 and an inner end 330. The outer end 340 may be exposed out of the housing 100. The operable part 301 may be arranged on the outer end 340 of the ejector 310. The inner end of the ejector 310 may be engaged with the rotator 320 through any proper manner such as abutting, welding or adhesion. The ejector 310 may be an integrated piece. The method for manufacturing the integrated piece includes but not limits to one or more of integrated formation, welding and adhesion. In this way, the structure of the ejector 310 is simpler and the mechanical strength is higher.

The rotator 320 may be used to transmit the movement of the ejector 310 to the electronic card 900 so as to lift the electronic card 900. The operable part 301 may be operated to move the ejector 310 along the second direction, and the ejector 310 may lift the electronic card 900 by the rotator 320, so that the electronic card 900 can be removed. The ejector 310 may move along the second direction, and the rotator 320 may convert the movement in the second direction into the lifting of the electronic card 900. Such a configuration enables the assembly 300 to have a simple structure, low manufacturing cost and reliable performance.

Figure 9:
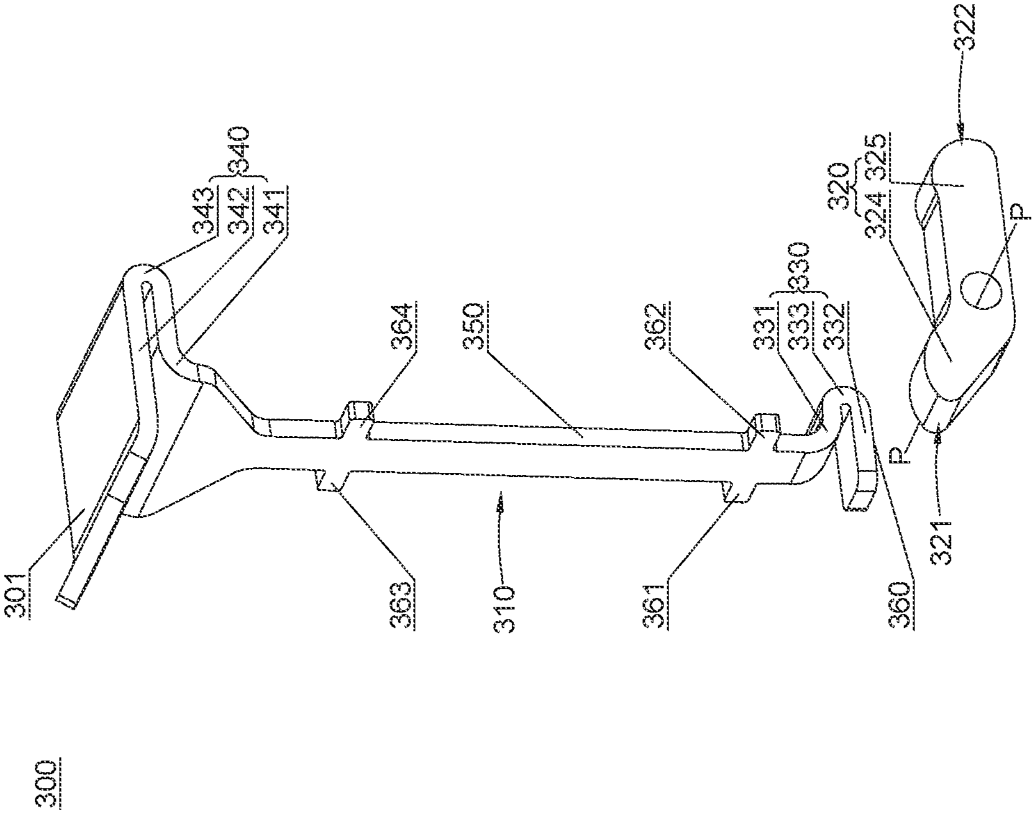
FIG. 9 is an exploded perspective view of the assembly shown in FIG. 8.

As shown in FIG. 9, the inner end 330 of the ejector 310 may have a contact surface 360. The contact surface 360 may abut against the rotator 320. By the contact surface 360, the contact area of the inner end 330 and the rotator 320 can be enlarged, so that the pressure intensity may be reduced, and damage to the inner end 330 and the rotator 320 may be avoided.

As shown in FIG. 4 to FIG. 8, the rotator 320 may be located at the bottom of the slot 110. The rotator 320 may be used to lift an inserted end of the electronic card 900 (for example, a lower end of the electronic card 900 in the figure). The rotator 320 may be pivotally arranged in the housing 100. The rotator 320 may be provided with a lifting shaft hole 326, the housing 100 may be provided with a housing shaft hole 140, and the electrical connector may further include a pivot 160. The pivot 160 may pass through the lifting shaft hole 326 and the housing shaft hole 140, so that the rotator 320 may be pivotally arranged in the housing 100. In other examples, the rotator 320 may be provided with a pivot, and the housing 100 may be provided with a shaft hole; or the housing 100 may be provided with a pivot, and the rotator 320 may be provided with a shaft hole. The ejector 310 and the electronic card 900 may be engaged with a first position and a second position of the rotator 320 respectively. The pivotable rotator 320 may transmit the second direction movement of the ejector 310 in the same direction. When the ejector 310 moves upwards, the second position may be pulled to move upwards and the rotator 320 may lift the electronic card 900. Alternatively or additionally, the rotator 320 may also transmit the second direction movement of the ejector 310 in the opposite direction. When the ejector 310 moves downwards, the second position may be pushed to move upwards and the electronic card 900 can be lifted.

Referring back to FIG. 9, an axis P-P of the rotator 320 may be located at a middle of the rotator 320. The ejector 310 may be engaged with a first end 321 of the rotator 320. A second end 322 of the rotator 320 may be used to lift the electronic card 900. The first position may be located at the first end 321, and the second position may be located at the second end 322. The ejector 310 and the electronic card 900 may act on two sides of the axis P-P respectively. When the ejector 310 and the electronic card 900 act on the rotator 320 on the same side of the axis P-P, the ejector 310 and the electronic card 900 may have the same movement direction. In the embodiments shown in the figures, the second end 322 of the rotator 320 may abut against an inserted end of the electronic card 900 and lift the electronic card 900. In other embodiments not shown, the second end 322 of the rotator 320 may also abut against other parts of the electronic card 900, for example, a groove on the side of the electronic card 900, and lift the electronic card 900.

The first end 321 of the rotator 320 may be pressed by the ejector 310 when the operable part 301 is pressed. The second end 322 of the rotator 320 may move upwards, and the electronic card 900 may be lifted.

The rotator 320 may include a first arm 324 and a second arm 325. The first arm 324 and the second arm 325 may be connected to form a V shape. The axis P-P may be located at a connecting part of the first arm 324 and the second arm 325. The first end 321 may be located on the first arm 324. The second end 322 may be located on the second arm 325. An opening of the V shape may face the top surface 101. An angle between the first arm 324 and the second arm 325 may be an obtuse angle. In this way, the second arm 325 may engage the inserted end of the electronic card 900, and the first arm 324 may bends upward, providing sufficient space for the movement of the first end 321.

A distance from the first end 321 to the axis P-P may be less than a distance from the second end 322 to the axis P-P. In this way, a distance of pressing the operable part 301 may be shortened, so that a space required for unlocking the electronic card 900 from the electrical connector can be further reduced.

Figure 10:
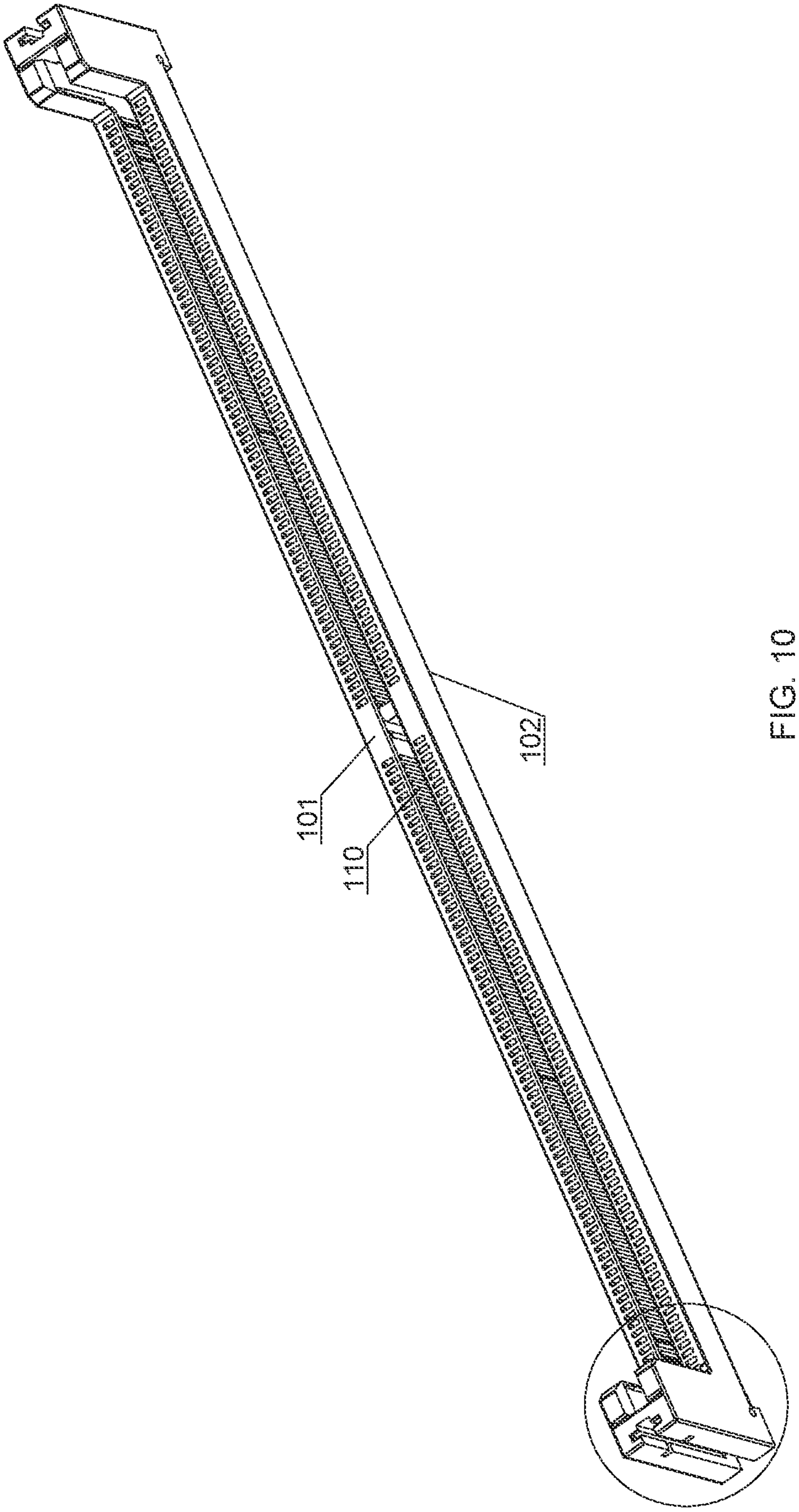
FIG. 10 is a perspective view of a housing of the electrical connector of FIG. 1.
Figure 11:
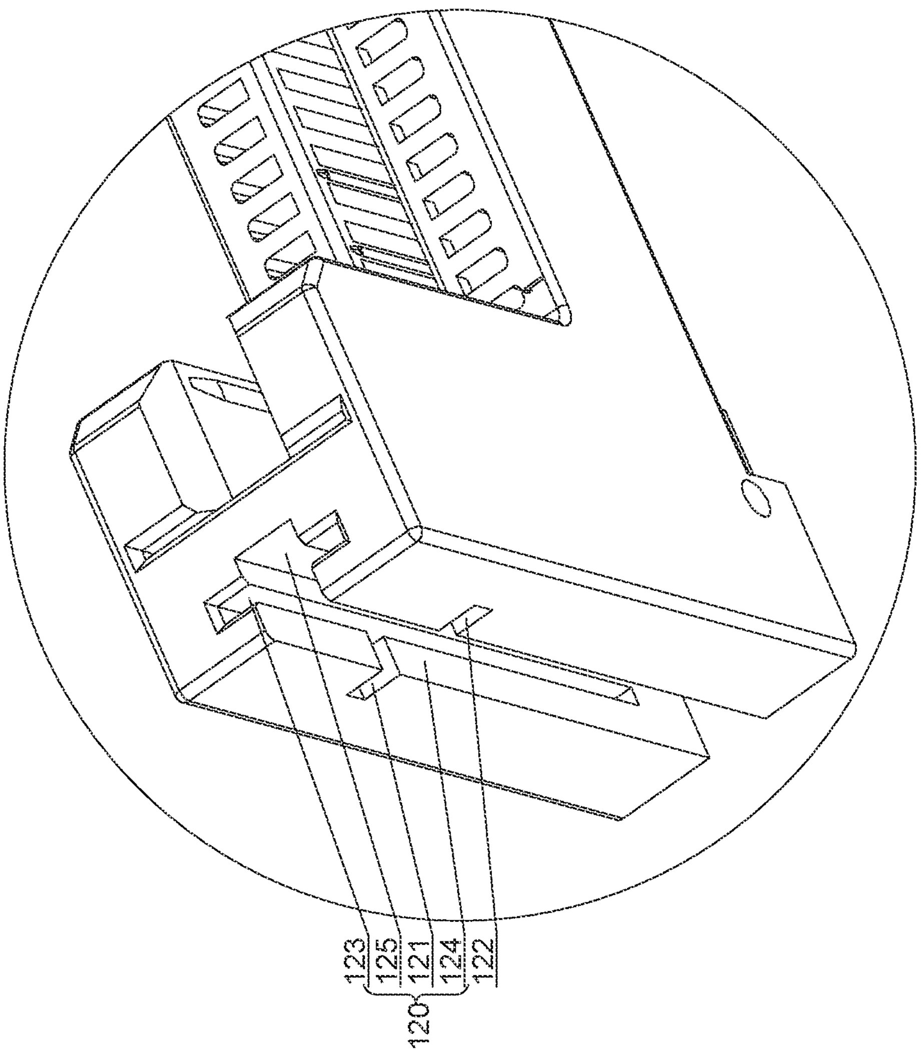
FIG. 11 is an enlarged perspective view of a portion of the housing circled in FIG. 10.
Figure 12:
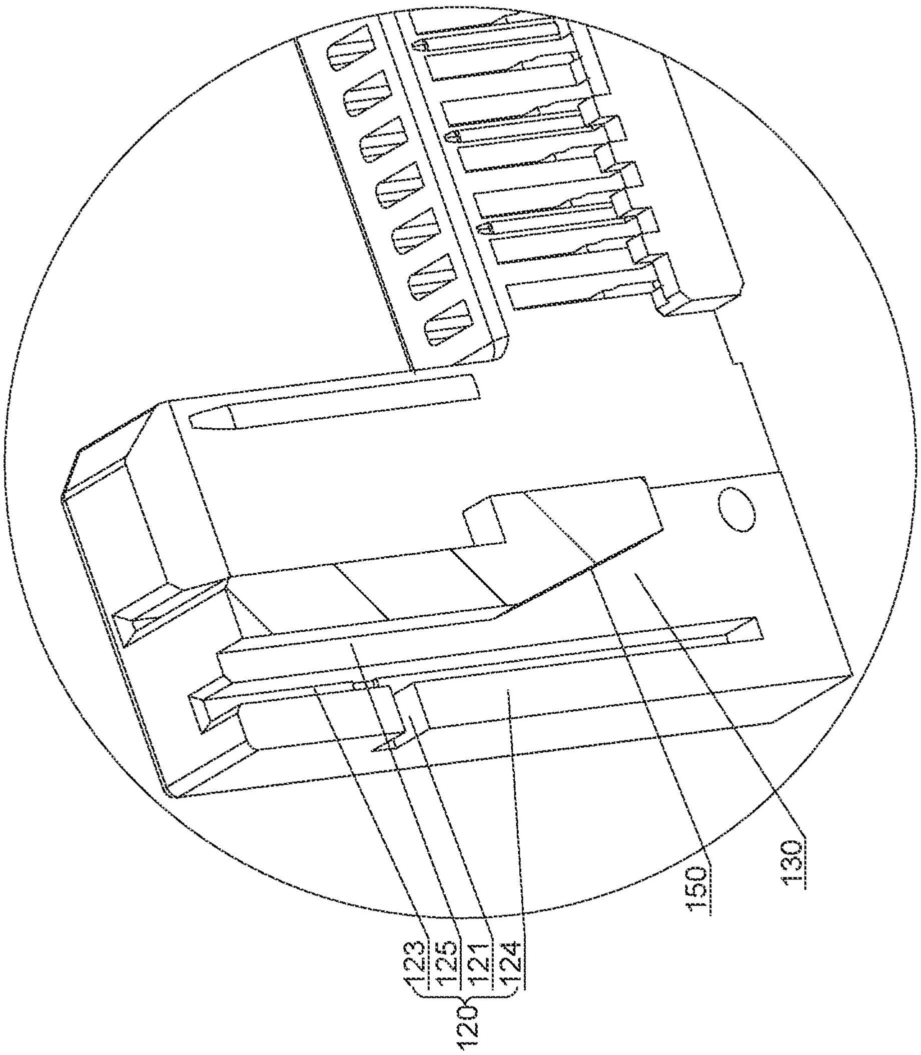
FIG. 12 is a cross-sectional perspective view of the portion of the housing of FIG. 11.

As shown in FIG. 10 to FIG. 12, the housing 100 may be provided with a mounting groove 120. The mounting groove 120 may include a first groove 123, a second groove 124, a first notch 121, and a second notch 122. The first groove 123 and the second groove 124 may extend in the second direction. The first groove 123 may be arranged in a side wall of the housing 100. The second groove 124 may communicate between a middle of the first groove 123 and an outer surface of the side wall. The second groove 124 may communicate the first groove 123 with the outside. A width of the second groove 124 may be less than a width of the first groove. The first notch 121 and the second notch 122 may extend from the second groove 124 to two sides respectively, and may communicate between the first groove 123 and the outer surface of the side wall. The first the notch 121 and the second the notch 122 may be the same or different. In the section view of the housing 100 that is sectioned perpendicular to the first direction at a position other than the first notch 121 and the second notch 122, the mounting groove 120 may be generally T-shaped. In the section view of the housing 100 that is sectioned perpendicular to the first direction at the first notch 121 and the second notch 122, the mounting groove 120 may be generally rectangular.

Referring back to FIG. 8 to FIG. 9, the ejector 310 may further include a portion 350, a first lug 361 and a second lug 362. The portion 350 may be connected between the outer end 340 and the inner end 330. The first lug 361 and the second lug 362 may respectively protrude towards two sides from the portion 350. When mounting the ejector 310 to the first groove 123 through the second groove 124, the first lug 361 and the second lug 362 may enter the first groove 123 respectively through the first notch 121 and the second notch 122. The portion 350 may align with the second groove 124, the first lug 361 and the second lug 362 may align with the first notch 121 and the second notch 122 respectively, then the portion 350 may pass through the second groove 124, and the first lug 361 and the second lug 362 may pass through the first notch 121 and the second notch 122 respectively. In this way, the portion 350, the first lug 361 and the second lug 362 may enter the first groove 123. Then the ejector 310 may be movable along the first groove 123. The electrical connector may further include a member 400, as shown in FIG. 8. The member 400 may be configured to limit the ejector 310 in the mounting groove 120. In this arrangement, the electrical connector is easy for manufacture, since the structure of the ejector 310 is simpler, and the assembly process is simple.

The member 400 may have various suitable structures. For example, the member 400 may have a structure for blocking all or part of the second groove 124, or may have a structure for blocking all of the second groove 124, the first notch 121 and the second notch 122. As shown in FIG. 8, the member 400 may include a first member 410 and a second member 420. The first member 410 may be inserted into the first notch 121. The second member 420 may be inserted into the second notch 122. In this arrangement, less materials are used for the member 400, and the manufacturing cost can be reduced.

As shown in FIG. 8 to FIG. 9, the portion 350 may further be provided with a third lug 363 and a fourth lug 364 which protrude towards two sides respectively. In this way, when the ejector 310 moves along the first groove 123, along a direction perpendicular to the extension direction of the slot 110 in a horizontal plane, the first lug 361, the second lug 362, the third lug 363 and the fourth lug 364 may be in contact with a groove wall of the first groove 123, and the portion 350 may be spaced apart from the first groove 123. Therefore, friction between the ejector 310 and the first groove 123 may be reduced, so that the ejector 310 can move along the mounting groove 120 more smoothly. Moreover, abrasion speeds of the ejector 310 and the mounting groove 120 can be reduced, and service lives of the ejector 310 and the mounting groove 120 can be prolonged. In addition, the contact area is reduced, so that the machining allowance can be improved.

As shown in FIG. 8 to FIG. 9, the third lug 363 may be located between the first lug 361 and the outer end 340. The fourth lug 364 may be located between the second lug 362 and the outer end 340. In this way, when the ejector 310 is mounted, the third lug 363 and the fourth lug 364 may be inserted into the first groove 123 from the top of the housing 100. There is no need to arrange any notch mated to the third lug 363 and the fourth lug 364 on the housing 100. Therefore, the electrical connector has a simpler structure and lower manufacturing cost.

As shown in FIG. 10 to FIG. 12, the mounting groove 120 may further include a third groove 125. The third groove 125 may be recessed from a side surface, opposite to the second groove 124, of the first groove 123 towards the slot 110. The third groove 125 may extend along the second direction. The third groove 125 may align with the portion 350. The side surface of the mounting groove 120 may be spaced apart from the portion 350 by means of the third groove 125, so that friction between the mounting groove 120 and the portion 350 can be further reduced. The ejector 310 can move along the mounting groove 120 more smoothly, the abrasion speeds of the ejector 310 and the mounting groove 120 can be further reduced, and the service lives of the ejector 310 and the mounting groove 120 can be further prolonged. In addition, the contact area is reduced, so that the machining allowance can be further improved.

The inner end 330 of the ejector 310 may extend into the second groove 124. In this way, the space of the second groove 124 may be utilized. The s inner end 330 may be configured to be larger, and the contact area between the inner end 330 and the rotator 320 may be increased, thereby reducing pressure intensity and avoiding damage to the inner end 330 and the rotator 320.

Referring to FIG. 4 to FIG. 7, FIG. 9 and FIG. 12, an end (that is, a lower end in the figure) of the first groove 123 may be provided with a fourth groove 130. The fourth groove 130 may be arranged opposite to the second groove 124. The inner end 330 of the ejector 310 may protrude towards the fourth groove 130. The protruded part may be accommodated in the fourth groove 130 during the movement of the ejector 310. A distance between the protruded part and the first lug 361 may be greater than a distance between the fourth groove 130 and the first notch 121. In the process of mounting the ejector 310, the protruded part may be inserted into the fourth groove 130 when the first lug 361 aligns with the first notch 121. After the mounting of the ejector 310 and the blocking of the first notch 121 by the member 400, the protruded part cannot reach an upper part of the first groove 123, and the ejector 310 cannot be separated from the housing 100.

Referring to FIG. 4 to FIG. 7, FIG. 9 and FIG. 12, a surface of the fourth groove 130 opposite to the second groove 124 may be an inclined surface 150. The inclined surface 150 may incline towards the slot 110 along a direction away from the top surface 101. The fourth groove 130 is gradually narrowed along an upward direction. When the ejector 310 moves upwards, the inclined surface 150 may have a buffering effect on the inner end 330 of the ejector 310, thereby achieving good hand feeling during use.

As shown in FIG. 9, the inner end 330 of the ejector 310 may be hook-shaped. The inner end 330 may include an initial section 331, a tail section 332, and a curved section 333. The curved section 333 may join the initial section 331 and the tail section 332. The initial section 331 may extend towards the slot 110 from the portion 350. The tail section 332 may extend towards the second groove 124 from the curved section 333. In this way, the contact area of the inner end 330 and the rotator 320 may be increased, and the inner end 330 and the rotator 320 may engage more stably. Further, the tail section 332 may be engaged with the rotator 320 by abutting against the rotator 320. In this way, the production process may be simpler, and the production efficiency may be improved.

As shown in FIG. 9, the outer end 340 of the ejector 310 may include an initial section 341, a tail section 342 and a curved section 343. The curved section 343 may join the initial section 341 and the tail section 342. The initial section 341 may extend towards the slot 110 from the portion 350 between the outer end 340 and the inner end 330. The tail section 342 may extend from the curved section 343 along a direction away from the slot 110. The outer end 340 may be hook-shaped. The operable part 301 may be located on a top surface of the curved section 343. A user may press the top surface of the curved section 343 which has larger contact area in use, thereby improving the use experience of operating the operable part 301.

In some embodiments, housing components, such as the housing 100 and members 400, may be dielectric members molded from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

In some embodiments, conductive components, such as terminals 800, may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

In some embodiments, connector components, such as the locking member 200, ejector 310, rotator 320, may be made of metal or any other material that provides suitable properties for their functions in an electrical connector. Examples of suitable materials include, but are not limited to, zinc, copper, aluminum, magnesium, lead, pewter, and tin-based alloys. Other suitable materials may be employed, as aspects of the present disclosure are not limited in this regard. The connector components may be formed from such materials in any suitable way, including by stamping and/or forming and/or molding.

The present disclosure has been described through the above embodiments, but it should be understood that the above embodiments are only for the purpose of illustration and description, and are not intended to limit the present disclosure to the scope of the described embodiments. In addition, it may be understood by a person skilled in the art that the present disclosure is not limited to the above embodiments, a variety of variations and modifications may be made according to the teaching of the present disclosure, and these variations and modifications all fall within the scope of protection of the present disclosure. The scope of protection of the present disclosure is defined by the appended claims and its equivalent scope.

Various changes may be made to the illustrative structures shown and described herein. For example, although the electrical connector described above are shown and described with reference to a card edge connector, it should be appreciated that aspects of the present disclosure are not limited in this regard, as any of the inventive concepts, whether alone or in combination with one or more other inventive concepts, may be used in other types of electrical connectors, such as backplane connectors, daughter card connectors, stacking connectors, Mezzanine connectors, I/O connectors, chip sockets, Gen Z connectors, etc.

In some embodiments, mounting ends were illustrated as surface mount elements that are designed to fit within pads of printed circuit boards. However, other configurations may also be used, such as press fit "eye of the needle" compliant sections, spring contacts, solderable pins, etc.

In the description of the present disclosure, it is to be understood that orientation or positional relationships indicated by orientation words "front", "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" may refer to the inside and outside relative to the contour of each component itself.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. An electrical connector, comprising:

a housing comprising a slot elongating in a longitudinal direction and a tower disposed at an end of the slot and extending in a vertical direction perpendicular to the longitudinal direction;

a plurality of terminals held by the housing, each of the plurality of terminals comprising a mating end curving into the slot, a mounting end extending out of the housing, and an intermediate portion joining the mating end and the mounting end; and an ejector and a rotator disposed in the tower, wherein the rotator is coupled to the ejector such that movement of the ejector makes the rotator rotate about an axis, wherein:

the ejector comprises an outer end extending out of a top surface of the tower, an inner end coupled to the rotator, and a portion joining the outer end and the inner end; and the inner end of the ejector comprises an initial section, a tail section, and a curved section joining the initial section and the tail section.

2. The electrical connector of claim 1, wherein:

the rotator comprises a first end coupled to the ejector and a second end extending into the slot, and the axis is located between the first end and second end of the rotator.

3. The electrical connector of claim 2, wherein:

the rotator comprises a first arm having the first end and a second arm having the second end, the axis is at a joint of the first arm and the second arm, and the first arm and the second arm extend in an obtuse angle.

4. The electrical connector of claim 2, wherein:

a distance from the first end to the axis is less than a distance from the second end to the axis.

5. The electrical connector of claim 1, comprising:

a locking member, wherein at least a portion of the locking member is elastic.

6. The electrical connector of claim 5, wherein:

the tower is a first tower, the ejector and rotator are a first ejector and a first rotator disposed in the first tower, the electrical connector comprises a second tower disposed at an opposite end of the slot and extending in the vertical direction, and the slot extends between the first tower and the second tower.

7. The electrical connector of claim 6, comprising:

a second ejector and a second rotator coupled to the second ejector such that a movement of the second ejector can make the second rotator to rotate about an axis.

8. The electrical connector of claim 7, comprising:

a second locking member, wherein at least a portion of the second locking member is elastic.

9. The electrical connector of claim 1, wherein:

the tower of the housing comprises a mounting groove comprising a first groove holding the portion of the ejector and a second groove extending through the tower, and a width of the second groove is less than a width of the first groove in a lateral direction perpendicular to the longitudinal direction and the vertical direction.

10. An electrical connector, comprising:

a housing comprising a slot elongating in a longitudinal direction and a tower disposed at an end of the slot, the tower comprising a mounting groove extending in a vertical direction perpendicular to the longitudinal direction;

a plurality of terminals held by the housing, each of the plurality of terminals comprising a mating end curving into the slot, a mounting end extending out of the housing, and an intermediate portion joining the mating end and the mounting end; and an ejector disposed in the mounting groove and configured to be movable within the mounting groove, wherein:

the ejector comprises an outer end extending out of the housing, an inner end opposite the outer end, and a portion joining the outer end and the inner end;

the mounting groove comprises a first groove holding the portion of the ejector and a second groove extending through the tower; and a width of the second groove is less than a width of the first groove in a lateral direction perpendicular to the longitudinal direction and the vertical direction.

11. The electrical connector of claim 10, wherein:

the ejector comprises a first lug and a second lug protruding from the portion in the lateral direction, the tower comprises a first notch and second notch extending from the second groove in the lateral direction, and the electrical connector comprises a first member disposed in the first notch and a second member disposed in the second notch.

12. The electrical connector of claim 11, wherein:

the mounting groove comprises a fourth groove comprising an inclined surface, and the inner end of the ejector comprises an initial section extending into the fourth groove, a tail section extending into the second groove, and a curved section joining the initial section and the tail section.

13. The electrical connector of claim 12, wherein:

a distance between the curved section and the first lug is greater than a distance between the fourth groove and the first notch in the vertical direction.

14. The electrical connector of claim 10, comprising:

a rotator disposed in the mounting groove and comprising a first end coupled to the ejector and a second end extending into the slot, wherein the rotator is configured to rotate about an axis located between the first and the second end upon a movement of the ejector.

15. The electrical connector of claim 14, wherein:

the ejector comprises an outer end extending out of a top surface of the tower, an inner end coupled to the rotator, and a portion joining the outer end and the inner end.

16. The electrical connector of claim 14, wherein:

the rotator comprises a first arm having the first end and a second arm having the second end, the axis is at a joint of the first arm, and the second arm, and the first arm and the second arm extend in an obtuse angle.

17. The electrical connector of claim 16, wherein:

the first arm is shorter than the second arm.

18. The electrical connector of claim 10, comprising:

a locking member comprising a base portion attached to the tower and an intermediate portion cantilevering from the base portion, the intermediate portion comprising a protrusion curving away from the ejector.

19. A method of operating an electrical connector to release an electronic card mated with the electrical connector, the electrical connector comprising a housing having a slot elongating in a longitudinal direction and a tower disposed at an end of the slot, and an ejector and a rotator disposed in the tower, the rotator comprising a first arm coupled to the ejector and a second arm coupled to the electronic card, the method comprising:

moving the ejector in a vertical direction perpendicular to the longitudinal direction; and removing the electronic card from the slot, wherein the moving of the ejector causes the rotator to rotate about an axis located at a joint of the first arm and the second arm, and the first arm is shorter than the second arm.

20. The method of claim 19, wherein:

the electrical connector comprises a locking member disposed in the tower and engaging the electronic card, and the rotating of the rotator causes the locking member to deform and disengage the electronic card.

* * * * *